UNITED STATES PATENT OFFICE.

REVERE M. BREINIG, OF BROOKLYN, NEW YORK.

PROCESS OF THE TREATMENT OF SLUDGE-ACID.

SPECIFICATION forming part of Letters Patent No. 306,897, dated October 21, 1884.

Application filed November 26, 1883. (No specimens.)

*To all whom it may concern:*

Be it known that I, REVERE M. BREINIG, a citizen of the United States, and a resident of Brooklyn, in the county of Kings and State of New York, have invented certain new and useful Processes of the Treatment of Sludge-Acid and new and useful products therefrom, of which the following is a specification.

In the practice of various arts—such, for example, as the purification of petroleum and other hydrocarbon oils, asphalts, or bitumens, the distillation of coal, resin, and bitumens, starch-making, manufacturing of dyes, and others—there is produced as a residual product a substance known by the name of "sludge," which contains, among other matter, the acid, or a part of it, used in the manufacture. The acids most commonly used are sulphuric, acetic, muriatic, and nitric, although others are used in certain manufactures.

Sludge has heretofore had very little, if any, commercial value, it being somewhat used by manufacturers of fertilizers, and has not only been substantially a waste product, but also, owing to its intensely disagreeable and unhealthful odor and the presence of the acid in it, and, in certain cases, its inflammability, it has occasioned those engaged in the manufactures producing it great trouble, and frequently expense, to dispose of it so that it would not be detrimental to health or comfort. By my process I so treat the sludge as that I not only remove its disagreeable and unhealthful odors, but also derive from it directly and indirectly certain commercially-valuable products.

To practice my improved process I first prepare a soap, as follows: Take about seventy (70) pounds of rosin or any resinous gum—such, for example, only, as copal (Zanzibar) or kauri—and place the same in a kettle, and add thereto about eight (8) gallons of linseed or other vegetable, animal, or mineral oil, it may be either hot or cold, and either raw or boiled; or, as an equivalent therefor, about fifty-five (55) pounds of tallow or other fats or grease. The kettle containing the above gum and oil, fat, or grease I put upon a fire until the gum is thoroughly melted and united with the oil, fat, or grease, preferably stirring it meantime in any suitable manner, to prevent burning and to effect more complete union. A jacketed kettle may be used, if desired, in this as well as the subsequent steps in my process, and it may be heated in any known manner. I then put into another kettle about fifty (50) gallons of water, hot or cold, and put into it about twenty (20) pounds of caustic soda or other caustic lye, preferring, however, the caustic soda, because of its superior strength. I then place this second kettle on the fire and allow the contents to boil until the caustic is thoroughly dissolved in the water, preferably stirring it meantime in any desired manner, to hasten the operation. I then thoroughly mix the contents of these two kettles, preferably by boiling, until saponification takes place, thus forming a soap. To the soap thus formed I add, preferably when hot, ordinary commercial salt, in the proportion of about a pound of salt, more or less, to a gallon of soap, thus separating from the soap by a well-known action the excess of alkali, which I then draw off from the soap by means of a filter or in any other suitable manner. The soap may be used without using the salt for the removal of the excess of alkali; but I prefer to remove it. When the salt is used and the excess of alkali removed, the soap is considerably thickened; and to render it sufficiently thin or liquid again I add, after the alkali has been separated, about one hundred (100) gallons (more or less) of water, hot or cold, and mix the same thoroughly with the soap, preferably by boiling, thus forming a soap solution. The soap solution thus prepared I place in a suitable tank or vat, preferably so located that the sludge may flow into it from the receptacles in which it is left at the close of the operation by which it is produced, and I then let the sludge flow into the tank containing the soap solution. There should be about one (1) gallon of the soap solution to from three to four gallons of the sludge. While the sludge is flowing into the soap solution I prefer to stir them together by any suitable means, so that the sludge may be thoroughly acted upon by the soap solution. The stirring, however, is not essential. When this is done, the tar and oily parts of the sludge chemically combine with the resinous gums, oils, fats, or grease contained in the soap solution, leaving the acid separate by itself. This chemically combined part of the separated sludge I will call the "sludge-tar." The acid thus separated out of the sludge, or, in other words, separated from the sludge-tar, may be drawn off in any known manner for use in the arts. It possesses, when the proportions of the ingredients are as stated by me, a strength of about 46° Baumé; and this acid I use with zinc, lead, barytes, manganese, iron, copper, and other metals, producing salts of these metals in crystals. This is true, irrespective of the kind of acid used in the manufacture which produces the sludge—i. e., sulphuric, nitric, acetic, muriatic, and others. The acids thus freed by my process possess properties not found in acids separated by the sludge by other processes, and not found in ordinary commercial acids found in the market. These acids form the subject of another application for Letters Patent therefor filed by me January 28, 1884, Serial No. 119,012.

I mention the foregoing uses of the recovered acids as examples only. It may, if desired, be drawn off into suitable vessels and sold in the market for other uses. If, however, it is not desired to preserve the acid, then by adding to it ordinary lime or other disinfectants all disagreeable odor will be removed, and the acid may then be run off into a sewer, and thus disposed of as other waste products are, without detriment or causing a nuisance. There is, however, but little smell to the acid thus separated, and it can, without detriment, be turned into the sewer without the addition of lime or other disinfectant.

From the sludge-tar combined with the soap I make certain valuable commercial products—a varnish and a fuel, which respectively form the subjects of two applications for Letters Patent therefor, both filed the 28th of January, 1884, and numbered, respectively, 119,011 and 119,010.

Although I have stated the ingredients and their proportions which I employ in making the soap used by me, I wish it to be understood that I do not limit myself to a soap composed of those ingredients in the proportions stated or any other proportions, because the described separation of the sludge may be effected by the use of any soap. I prefer, however, that described by me, because I believe the presence of the resinous gum facilitates the separation.

I do not limit myself to the precise quantities of the ingredients named, since they may be somewhat varied and still my invention be embodied.

Having thus described my invention, I claim—

The described process of treating sludge, consisting in mixing therewith a soap compound adapted to unite with the sludge-tar, and then drawing off or otherwise separating from the tarry mass thus obtained the free acid, substantially as specified.

Signed at New York, in the county of New York and State of New York, this 24th day of November, A. D. 1883.

REVERE M. BREINIG.

Witnesses:
PHILLIPS ABBOTT,
JOHN J. CAULDWELL.